(No Model.) 2 Sheets—Sheet 1.
L. H. TAYLOR, Jr.
HAND BRAKE FOR BICYCLES.
No. 593,251. Patented Nov. 9, 1897.
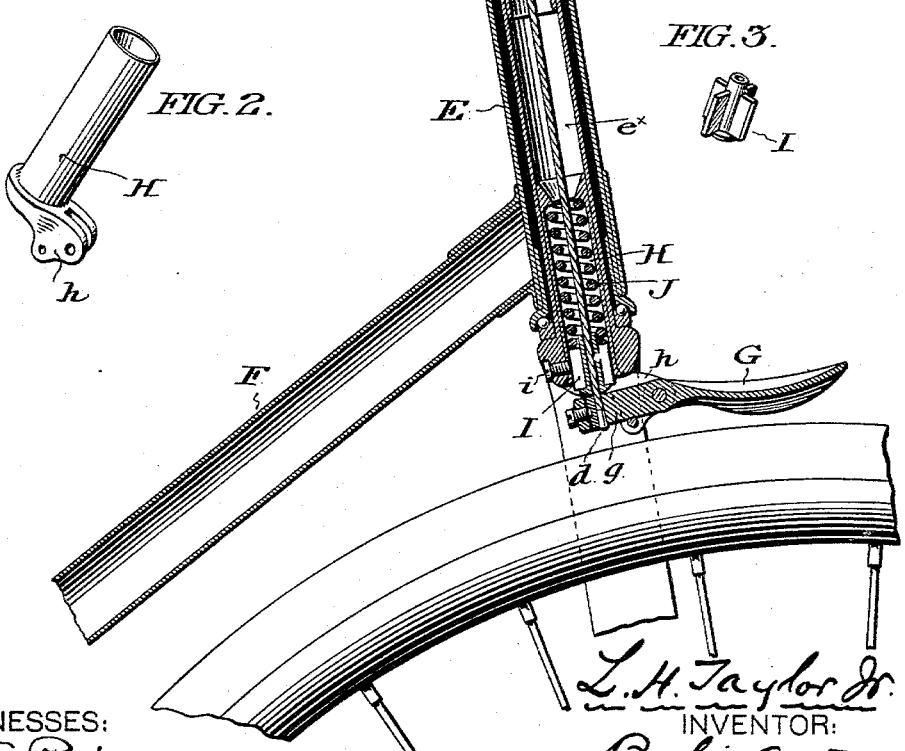
WITNESSES:
N. E. Paige
F. N. Dixon
L. H. Taylor Jr.
INVENTOR:
By his Attorneys,
Wm. C. Strawbridge
Bonsall Taylor (No Model.) 2 Sheets—Sheet 2.
L. H. TAYLOR, Jr.
HAND BRAKE FOR BICYCLES.
No. 593,251. Patented Nov. 9, 1897.
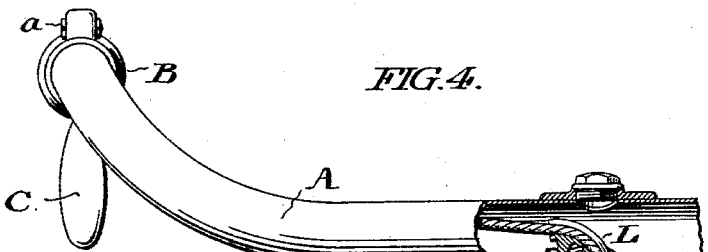
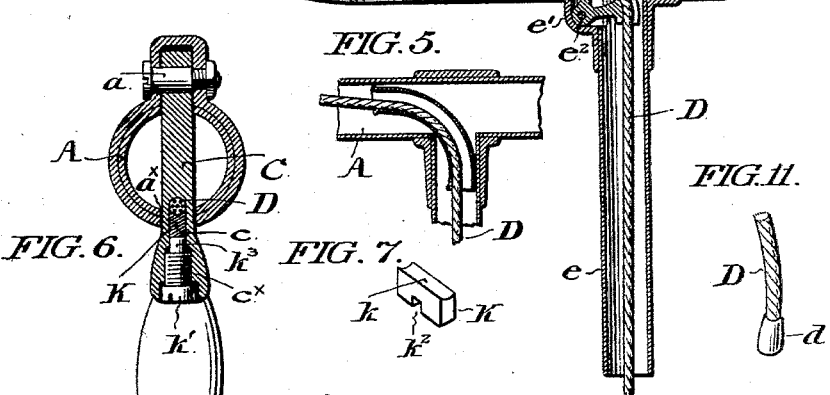
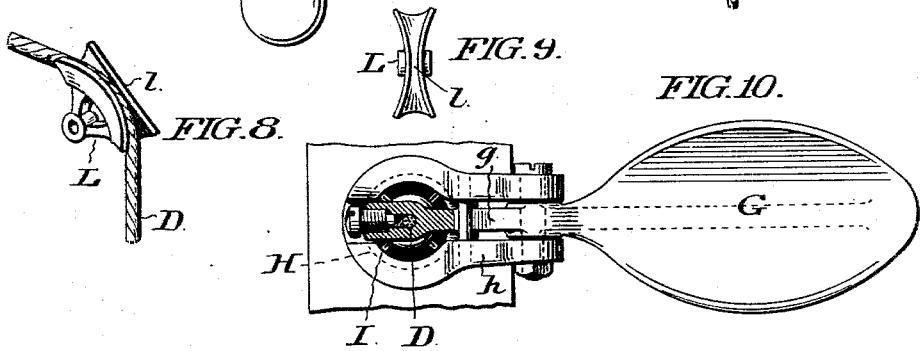
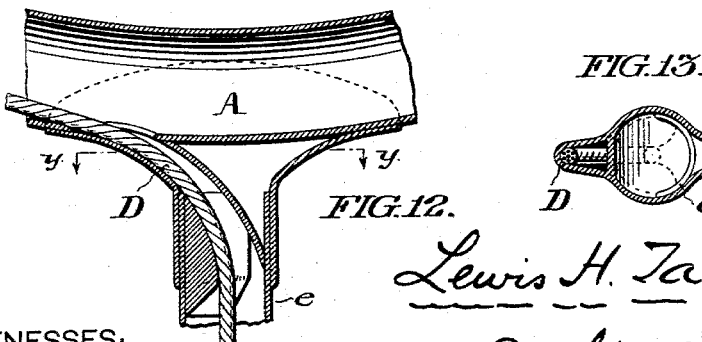
WITNESSES:
N. E. Paige
F. N. Dixon.
INVENTOR:
Lewis H. Taylor Jr
By his Attorneys,
Wm C Strawbridge
Bonsall Taylor

UNITED STATES PATENT OFFICE.

LEWIS H. TAYLOR, JR., OF PHILADELPHIA, PENNSYLVANIA, ASSIGNOR TO PERCIVAL CHRYSTIE, OF HIGH BRIDGE, NEW JERSEY.

HAND-BRAKE FOR BICYCLES.

SPECIFICATION forming part of Letters Patent No. 593,251, dated November 9, 1897.

Application filed January 27, 1897. Serial No. 620,854. (No model.)

*To all whom it may concern:*

Be it known that I, LEWIS H. TAYLOR, Jr., a citizen of the United States, residing in the city and county of Philadelphia, in the State of Pennsylvania, have invented certain new and useful Improvements in Hand-Brakes for Bicycles and Similar Vehicles, of which the following is a specification.

My invention relates in general to the class of devices in which a cord, strap, rope, chain, or kindred flexible connection, extends through the interior of one lateral member or arm of the handle bar from a hand lever, applied in connection with the terminal hand grip of said arm, with which it is connected, down through the hollow interior of the steering head of the frame to direct or intermediate attachment with a brake located in the region of the fork head of the forks of the steering wheel and adapted to operate upon said wheel.

My invention relates in particular to, and embodies improvements upon, a certain hand brake for a bicycle invented by William S. Halsey, of Philadelphia aforesaid, which forms the subject-matter of an application for patent duly executed by the said Halsey upon the 9th day of January, 1897, and duly filed in the United States Patent Office upon the 12th day of January, 1897, as Serial No. 618,921.

The Halsey brake, generally stated, comprehends the application of a bent or substantially right-angular hand lever to the terminal portion of an arm of a handle bar in adjacency to the hand grip, by introducing one end of the hand lever to within the interior of the hollow handle bar by passing said end through a substantially longitudinal slot or other opening in a wall, and preferably the under wall, of the bar,—and by pivoting or fulcruming the end portion so introduced with respect to and substantially within the handle bar, and connecting the concealed cord with the inserted or, so to speak, fulcrumed portion of the lever,—the other or free or handle end of the lever being extended in substantial parallelism with the hand grip and being adapted to be moved with respect to its fulcrum toward or away from the hand grip.

My invention has for its principal object the application to a brake of the character of Halsey's, of means, easily accessible from the exterior of the handle bar, applied to the hand lever, for permitting of the adjustment and locking with respect to the hand lever of the concealed flexible connection, in order that the point of attachment of said connection to the lever may be readily altered or varied to permit of such lengthening or shortening of the connection as is necessary to permit of the desired raising or lowering of the handle bar with respect to the steering head of the machine,—provision, in association with such means, being also made for the stowing away or concealing within the handle bar of such surplus length of the connection as is necessary to permit of the raising of the handle bar from its lowest position to the highest position which its range of adjustment permits.

My invention has for its further object the provision of means for facilitating the flexure of the cord at the junction of the handle bar with the hollow handle bar stem which is a member of the extensible connection between said handle bar and the front forks, in order to permit of the longitudinal adjustment of the cord with respect to the hand lever without interference with its movement by the aid of said means around the corner so to speak between the handle bar and steering head; and, finally, the provision of means for detachably securing said connection to the brake.

To the foregoing ends my invention, generally stated, comprehends the application to a bent or substantially right-angular hand lever, one end of which passes through an opening in adjacency to the hand grip of a hollow handle bar and the other end of which is adapted to be moved toward and from said hand grip, and which is pivoted to said handle bar,—and also to a flexible brake-operating connection which extends through a handle bar arm and the hollow steering head to a brake applied to the forks, and is connected with the hand lever in such manner that the movement of the outer end of said lever toward the handle bar will exert traction upon it and thereby occasion the operation of the brake,—of a device in the nature of a clamp, lock, or kindred means of connection or attachment, which is easily accessible for operation from the exterior of the handle bar, and which is adapted to clamp, lock, or otherwise adjustably connect the upper end, or handle bar portion, of the flexible connection with the hand lever in any position of longitudinal adjustment of said connection necessitated by the vertical adjustment of the handle bar with respect to the steering head.

My invention further comprehends the concealment of such surplus end or extra length of the upper portion of the flexible connection as is necessary to permit of the elevation of the handle bar from its lowermost position to its uppermost possible position, by folding it, or stowing it away, so to speak, within the hollow portion of the handle bar.

My invention further comprehends the provision, in combination with the devices above referred to, of a pivoted flanged segment applied at the intersection of the handle bar and its depending hollow stem for directing the cord about the angle of said intersection.

A bicycle embodying preferred types of my improvements is represented in the accompanying drawings and hereinafter described.

In the drawings,

Figure 1 is a central, vertical, side, sectional, elevation through the steering head and a portion of the main frame of a safety bicycle,—the end portion of the hand grip and brake hand lever of the right hand arm of the handle bar being shown in longitudinal side sectional elevation, and a portion of the steering wheel and forks being shown in elevation.

Figure 2 is a perspective detail of a brake-lever-spring sleeve which may conveniently be employed.

Figure 3 is a similar view of a winged abutment for the brake spring applied within said sleeve.

Figure 4 is a front elevation, partly sectional, of the right hand arm of the handle bar represented in Figure 1.

Figure 5 is a fragmentary sectional view of the intersection between the handle bar and the hollow bar stem or sleeve of said bar, representing the application of a directing tube by the aid of which the cord is deflected.

Figure 6 is an enlarged transverse sectional detail through the handle bar and hand lever, in planes of the dotted lines $x$—$x$ in Figure 1 and sight being taken in the direction of the arrows upon said line.

Figure 7 is a perspective view of a convenient form of locking shoe by means of which the cord is locked to the hand lever, and to the brake lever.

Figure 8 is a view in perspective of the pivoted flanged segment, shown in Figure 4, which constitutes the preferred means for bending the cord about the intersection of the handle bar with the bar stem.

Figure 9 is an edge or face view of the same.

Figure 10 is a bottom plan view of the steering head and brake.

Figure 11 is a perspective detail of a ferrule applied to the end of the flexible connection for facilitating its attachment to the brake.

Figure 12 is a view similar to Figure 5 illustrating a modified form of construction of the directing tube for the cord.

Figure 13 is a bottom sectional plan through the device represented in Figure 12, in the plane of the dotted lines $y$—$y$ upon said figure.

Similar letters of reference indicate corresponding parts.

In the drawings,

A represents the hollow handle bar, of any suitable construction or material, but preferably formed of a hollow metal tube.

B represents the grip or handle proper, hereinafter designated the hand grip, of any preferred character, and preferably provided with a threaded or otherwise removable terminal cap $b$.

C is the hand lever, which, as stated, is of a bent, or generally right angular form,—and which as to its external or handle end is preferably enlarged in any usual manner to conform to the hand of the rider, and as to its internal end, or that introduced within the handle bar, is preferably flattened to be thin enough to pass through a narrow slot or opening $a^\times$ in said handle bar.

$a$ is the fulcrum or pivot pin of the hand lever, and D the concealed brake-operating cord, which, in order that the handle bar may be externally entirely unobstructed, passes through the interior of said handle bar, thence down through the interior of a tubular extensible connection conveniently composed of the hollow handle bar stem $e$ and the hollow fork head sleeve $e^\times$ with which said stem is telescopically related, between the handle bar and fork head, itself contained in the usual manner within the hollow steering head E of the frame F, to an attachment with a brake G, pivoted in a fulcrum bearing $h$ formed on a brake-lever-spring sleeve H, Figure 2, conveniently applied within the fork-head in for instance the manner represented in Figure 1.

I, Figure 3, is a sliding winged abutment for the brake spring J, adapted to be inserted within the lower end of the brake-lever-spring sleeve H, which latter is kept in place by a fastening screw $i$, or any preferred means.

The brake-lever-spring sleeve and sliding abutment form no part of my present invention.

The flexible connection D is at its lower extremity conveniently terminated in a ferrule or thimble $d$, Figure 11, and is secured, in the form of brake shown, to a rearwardly extending operating lever arm $g$ of said brake, by an attaching or clamping means of any preferred character, conveniently of that shown and described in connection with the hand lever.

The clamping device which I apply to the hand lever for locking or positively attaching the upper end of the flexible connection to said lever in any desired position of longitudinal adjustment of said connection with respect to said lever and the handle bar, and which device is accessible from the exterior of the handle bar,—may be variously formed and applied, and I do not confine myself to any special form or mode of application, although the device represented in the drawings is well adapted for the purpose.

That device is of the following construction:—

K is a clamping block, shown removed in Figure 7,—which is seated in a slot, groove, cleft, seat or other recess, $c$, in the hand lever, through which slot also passes the flexible connection,—which is preferably longitudinally grooved at $k$ along its inner edge to conform it to said connection,—and which, when introduced into its seat, is adapted to be pressed upon the flexible connection so as to lock it within said slot or seat and with respect to the lever, by means of the locking screw $k'$ threaded into a suitable screw-seat $c^\times$ formed in the lever and opening outwardly so that the head of the screw when introduced is accessible from the exterior of the handle bar.

In order to secure the accurate action of the locking screw for the clamping of the clamping block upon the flexible connection I prefer to form in the clamping block a notch $k^2$ for the inner end $k^3$ of the locking screw which end is preferably unthreaded and is turned down to the breadth of the clamping block as shown in Figure 6.

I prefer also, as shown in Figure 6, in order to permit of constant tightening up as the parts wear, to form the threaded screw seat $c^\times$ for the locking screw of sufficient depth to permit of the engagement of the end of the screw with the clamping block before the screw seats itself in the bottom of its seat.

The foregoing clamping device is, as stated, typical only of a suitable device for adjustably connecting the upper end of the flexible connection with the hand lever.

The upper end $d^\times$ of the flexible connection is, as shown in Figure 1, and in order to stow it away, folded within the hollow of the handle bar between the lever and the terminal cap $b$ of the hand grip.

In the adjustment of the flexible connection with respect to the hand lever, it is ordinarily only necessary to loosen the locking screw, the connection, in the raising or lowering of the handle bar, simply slipping through the seat in the lever.

When, however, it is desired to tighten the connection, it is possible to do so by removing the cap of the hand grip, pulling out the end of the connection and exerting traction upon it.

L, Figures 4, 8, and 9, is a flanged segment applied at the intersection of the handle bar and its hollow depending bar stem, and pivoted thereto, conveniently in an offset $e'$, by means of the pivot pin $e^2$.

The flanges of this segment, as shown in Figures 8 and 9, approach each other closely at the central portion of the circumferential groove, but diverge at the end portions so that the groove, through which the flexible connection is led, is contracted at its central portion as at 1 so as, in the ordinary operation of the parts, to almost clench and hold the connection firmly between the flanges, while at the same time not holding it so tightly as to prevent its being pulled through or slipped along the groove in the adjustment of the connection in the raising and lowering of the handle bar.

The diverging end portions of said segment facilitate the lateral flexure of the connection incident to the use of curved handle bars of varying shape.

As a substitute for the foregoing segment, I have in Figure 5, and again in Figures 12 and 13, illustrated permanently applied directing tubes or opposite ways for guiding the connection around the intersection of the handle bar and its stem.

Having thus described my invention, I claim—

1. The combination to form a bicycle hand brake, of the following elements:—a hollow handle bar,—a hand lever pivoted to said handle bar, one end of which passes through an opening in said bar in adjacency to one of its hand grips and the other end of which is adapted to be moved toward and from said handle grip,—a flexible brake-operating connection within the handle bar so connected with the hand lever that the movement of the outer end of said lever toward the handle bar will exert traction upon said connection,— and a clamping device applied to the hand lever and accessible from the exterior of the handle bar for locking or positively attaching said connection to said lever in any desired position of adjustment of said flexible connection with respect to said lever and handle bar,—substantially as set forth.

2. The combination to form a bicycle hand brake, of the following elements:—a hollow handle bar,—a hand lever pivoted to said handle bar, one end of which passes through an opening in said bar in adjacency to one of its hand grips and the other end of which is adapted to be moved toward and from said handle grip,—a flexible brake-operating connection within the handle bar so connected with the hand lever that the movement of the outer end of said lever toward the handle bar will exert traction upon said connection,— and having its end portion concealed within the hollow interior of said handle bar,—and a clamping device applied to said hand lever and accessible from the exterior of the handle bar for locking or positively attaching said connection to said lever in any desired position of adjustment of said flexible connection with respect to said lever and handle bar,— substantially as set forth.

3. The combination, in a bicycle hand brake, with a hollow handle bar having a hollow bar stem, of a flexible connection extending through the hollow interior of both the handle bar and stem, and a flanged segment pivoted at the intersection of said handle bar and stem over which the flexible connection passes and is also circumferentially movable,—substantially as set forth.

4. The combination to form a bicycle hand brake, of the following elements:—a hollow handle bar,—a hand lever pivoted to said handle bar, one end of which passes through an opening in said bar in adjacency to one of its hand grips and the other end of which is adapted to be moved toward and from said handle grip,—a flexible brake-operating connection within the handle bar so connected with the hand lever that the movement of the outer end of said lever toward the handle bar will exert traction upon said connection,—a clamping device applied to the hand lever and accessible from the exterior of the handle bar for locking or positively attaching said connection to said lever in any desired position of adjustment of said flexible connection with respect to said lever and handle bar,—a brake acting upon the steering wheel and operated by said flexible connection,—a clamping device upon said brake for detachably securing said connection to said brake, which consists of a longitudinally grooved clamping block provided with a notch, which is seated in a vertically-disposed opening through the rear arm of the brake, and of a locking screw adapted to a threaded aperture formed in said rear arm of the brake and terminating in said opening, which is adapted to force the block into contact with the flexible connection,—substantially as set forth.

In testimony that I claim the foregoing as my invention I have hereunto signed my name this 26th day of January, A. D. 1897.

LEWIS H. TAYLOR, JR.

In presence of—
L. SCHUTTE,
J. BONSALL TAYLOR.